(12) United States Patent
Arbter et al.

(10) Patent No.: US 6,545,663 B1
(45) Date of Patent: Apr. 8, 2003

(54) METHOD AND INPUT DEVICE FOR CONTROLLING THE POSITION OF AN OBJECT TO BE GRAPHICALLY DISPLAYED IN VIRTUAL REALITY

(75) Inventors: Klaus Arbter, Landsberied (DE); Klaus Landzettel, Geltendorf (DE); Gerd Hirzinger, Seefeld (DE)

(73) Assignee: Deutsches Zentrum Für Luft- und Raumfahrt e.V., Köln (DE)

( * ) Notice: Subject to any disclaimer, the term of this patent is extended or adjusted under 35 U.S.C. 154(b) by 0 days.

(21) Appl. No.: 09/551,124

(22) Filed: Apr. 18, 2000

(30) Foreign Application Priority Data

Apr. 19, 1999 (DE) .......................................... 199 17 660

(51) Int. Cl.[7] .................................................. G09G 5/08
(52) U.S. Cl. ........................ 345/158; 345/156; 345/863
(58) Field of Search ................................ 345/156, 157, 345/158, 784, 785, 851, 863, 684

(56) References Cited

U.S. PATENT DOCUMENTS 5,856,844 A * 1/1999 Batterman et al. .......... 345/158

FOREIGN PATENT DOCUMENTS

| EP | 0 813 040 | 12/1997 |
| WO | 98 00774 | 1/1998 |
| WO | 98 13745 | 4/1998 |
| WO | 98 13746 | 4/1998 |

* cited by examiner

Primary Examiner—Kent Chang
(74) Attorney, Agent, or Firm—Browdy and Neimark, P.L.L.C.

(57) ABSTRACT

In virtual reality, the position of a graphically-displayed object (1) in a three-dimensional view on a display device (3) of a graphics workstation is controlled by way of a human-machine interface, in which the hand (5) of an operator can displace and rotate an input medium in an arbitrary spatial direction. One or more stationary electronic cameras records or record one or more unique marking symbols (9) provided on the underside of a material, easy-to-handle model object (6) serving as an input medium, the underside facing the camera(s). The unique marking symbols (9) are evaluated with a computer according to image-processing methods such that the spatial position of the model object and the recognition thereof are the result of the evaluation.

Figure 1:
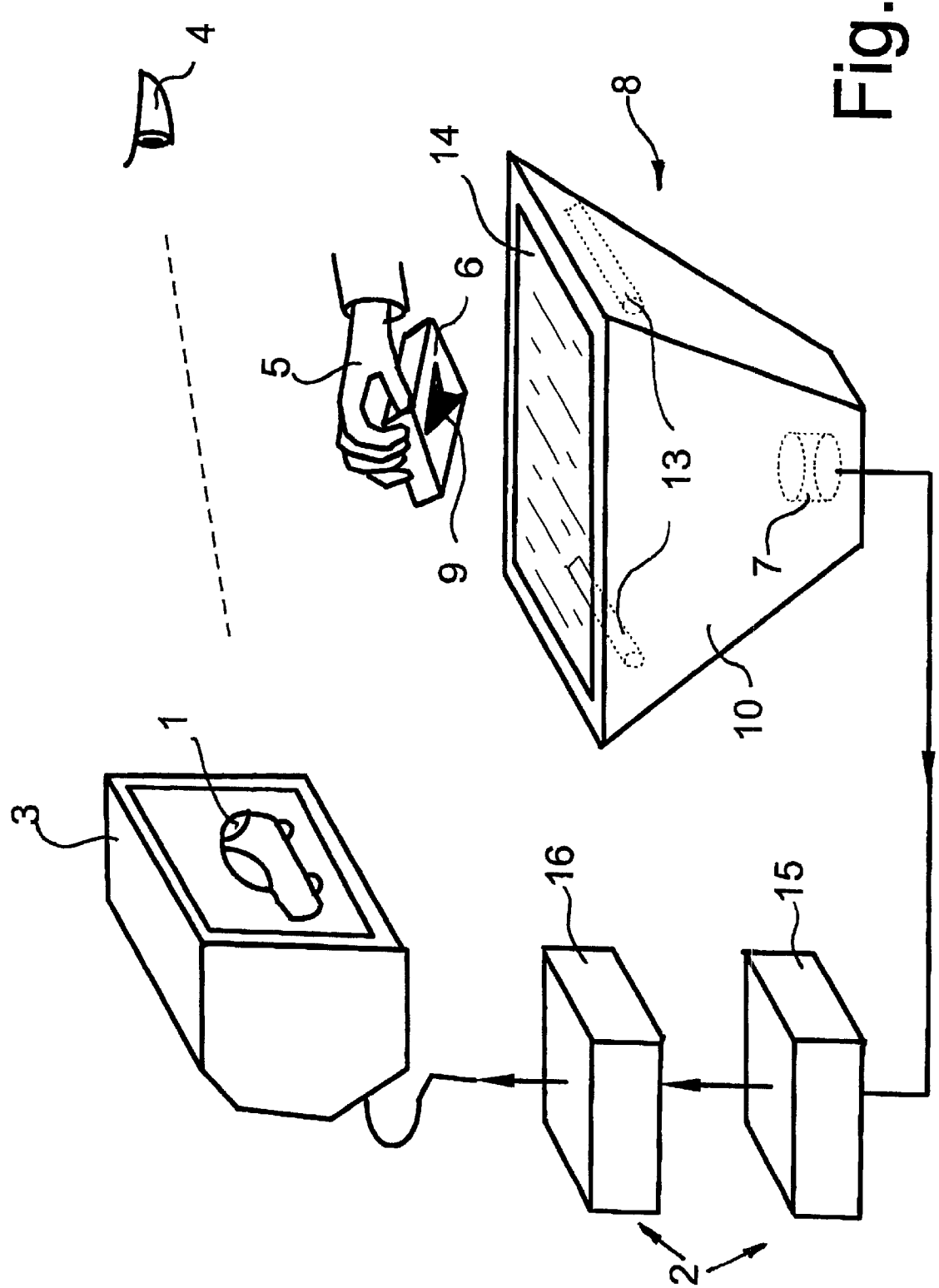

The result of the evaluation is transmitted to a graphics unit (graphics workstation, PC graphics). The associated object is displayed, in the position of the model object as predetermined by the operator's hand, as virtual reality on the display device (3) of the graphics unit. The invention can be used, for example, in the advertising field for displaying advertised products in desired positions.

19 Claims, 3 Drawing Sheets

METHOD AND INPUT DEVICE FOR CONTROLLING THE POSITION OF AN OBJECT TO BE GRAPHICALLY DISPLAYED IN VIRTUAL REALITY

The invention relates to a method for controlling the position of an object to be displayed in virtual reality on a display device of a graphics unit by way of a human-machine interface, with one or more stationary electronic cameras recording one or more unique marking symbols located on a side of the object facing the camera(s), and the images being evaluated with a computer in accordance with image-processing methods to yield the spatial position of the object, which is transmitted to the graphics unit, the associated object being correspondingly displayed, in the predetermined position of the object, as virtual reality on the display device.

The invention further relates to an input device for executing the method.

The human manipulation of the spatial position of objects is significant for numerous technical fields. It is fairly difficult, however, for a person to simultaneously control such an object, e.g., an excavator, in several degrees of freedom. Nevertheless, a great need exists for this option, especially in computer graphics. Here, the user wishes to view simulated, i.e., virtual, objects in selected views on the monitor, and select or alter the desired view as simply as possible.

In the most extreme case, this means that three translational and three rotary degrees of freedom must be controlled simultaneously. To facilitate the mastering of this task, an individual requires a user-friendly human-machine interface. The interface should resolve complex behavior patterns of the person into control signals for the computer. In principle, any system that can detect the position and orientation of the human hand in and around all three spatial directions through measurements is suited for this task.

In this connection, an input device of a human-machine interface is known as "Space Mouse" (registered trademark). This input device is used to control three rotational and three translational degrees of freedom for 3-D computer graphics; the device has a cover, which is flexibly mounted to a base plate and can be pushed and rotated by hand in/around a desired spatial direction. The deflections are measured, and can be interpreted as movement commands. This device is already in widespread use in the sense of a speed control in computer graphics.

This input device, however, only permits deflections of a few millimeters or degrees. It is therefore suited as a control device for translational and rotational speeds, but not for positions and angles. Its use is limited to a small working area, and the user must familiarize himself with the device and practice using it.

Exoskeletons and hand controllers have been developed for controlling positions and orientations. Exoskeletons and hand controllers are extremely complex mechanical structures, and are therefore not considered for applications in which the movements of the operator's hand are limited by mechanical parts.

The so-called Data Glove (or Power Glove) is an input device used in applications in the area of cyberspace and virtual reality. It comprises a glove that is provided with sensors and is connected via cables to a computer. The computer is programmed to react to finger and wrist movements. Thus, in a graphic computer simulation, virtual objects can be recorded and manipulated by a virtual hand. Gross hand movements (arm movements) are not detected, however. The Data Glove is thus not suitable for solving the problem.

Another known device is the so-called joystick, which is primarily used in games and simulations. It is a small, easy-to-handle input device comprising a movable, manually-operated control lever. The joystick serves in controlling objects in different directions. Usually, two degrees of freedom can be controlled, similarly to the computer mouse connected to more modern computers. Due to special designs, rotating the handle permits the control of a further degree of freedom. Generally, the available degrees of freedom are insufficient. Even in the applications in which they suffice, however, joystick operation stipulates a familiarization phase, similarly to the "Space Mouse" (registered trademark).

Tracking systems (by the Polhemus company) are also known; in these systems, a transmitter creates a magnetic field, and the receiver derives the transmitter's position and orientation from the magnetic field. While electromagnetic trackers ascertain the position and the orientation, and would therefore be suitable for taking measurements, the receiver, which the operator holds in his hand, must be connected to the electronic evaluation unit by way of an awkward cable or a radio device. Furthermore, iron parts skew the measurement result. Finally, these systems are very expensive.

In an interactive method known from WO 98/13746, a person carrying a sword is a virtual object, which is displayed in a graphics unit and battles a likewise virtual opponent. In this case, characteristic parts of the person's body (elbows, shoulders, knees, hips) are marked, as is the sword; these markings serve in establishing the location of corresponding points in the creation of the virtual image.

In this known method, the human-machine interface is formed by a plurality of stationary, electronic cameras, which record numerous unique marking symbols located on the side of the object—namely, the person with the sword—facing the cameras. The images are then evaluated with a computer according to image-processing methods, the result being the spatial position of the person and sword, which is transmitted to the graphics unit. There, the associated person and sword are correspondingly displayed as virtual reality on the display device of the unit.

The person is thus not an operator holding a sword as an input medium. This setup is therefore not a human-machine interface that is actively operated by an operator's hand. Instead, the sword-bearing person observed by the camera is virtually simulated in his entirety on the display device of the graphics unit, because the device known from WO 98/13746 is intended to lead a match with a likewise virtual opponent in a computer-controlled game or computer-controlled exercise.

EP 0 813 040 A2 discloses a system for virtual modeling of a physical system with movable and immovable parts. Here, at least two video cameras are used to detect identification symbols of objects. These detected identification symbols are associated with objects displayed on a monitor, so a modeled virtual reality of the physical system appears on the monitor. No input of position information with the aid of an input medium guided by an operator's hand is provided in this system, however.

WO 98/00774 discloses a special embodiment of a scanner platform that is equipped with an optical detector, e.g., a video camera, and is intended to recognize identifications on physical objects, such as products, that are manually guided, in a first region, across a glass plate serving as a spatial reference. The video camera, which is disposed in a second region, namely beneath the glass plate acting as a spatial reference element, tracks the optical identifications of the objects guided across the glass plate, detects their signals and inputs them as input signals into a computer for evaluation and later display on a monitor. The object is only tracked in three degrees of freedom, namely relative to the position in the plane of the reference element and the orientation around the vertical.

It is the object of the invention to disclose a method and an input device for controlling the position of an object that is graphically displayed in virtual reality, with which an observation of markings of the virtually-displayed object by electronic cameras allows the position of the virtually-displayed object to be manually controlled by the operator without limitations of his hand movements, that is, neither by mechanical parts nor cables, permitting the most intuitive possible use.

According to the invention, which relates to a method of the type mentioned at the outset, this object is accomplished in that the spatial position of the virtually-displayed object is controlled by means of an input medium of the human-machine interface, which can be actively displaced and rotated by the operator's hand, and is formed by a material model object of the object to be displayed, which is easy to handle and is provided with the marking symbols.

The method of the invention is distinguished by the fact that any operator can successfully select and alter the desired view immediately, that is, without any practice. The direct spatial relationship between the material model object forming the input medium and the simulated computer-graphics model allows the operator to readily associate the correct use of the system, and operate it without previous experience.

The mobility of the hand of the input-medium operator is not impeded by mechanical components or electrical lines. The model object provided with the marking symbols is completely passive, and requires neither power nor built-in parts.

In an advantageous modification of the method according to the invention, the marking symbols provided on the model object also contain an identification of the respective object to be displayed as virtual reality, and are likewise recorded with the camera(s) and evaluated according to data-processing methods, so model objects provided with different marking symbols can be distinguished and their individual positions can be indicated, and the result of this evaluation is transmitted to a graphics unit (graphics workstation, PC graphics), with the object that has been recognized by way of its identification and thereby associated being displayed as virtual reality on the display device in the position of the respective model object, as manually predetermined by the operator.

An input device for executing the method of the invention is distinguished by the fact that the marking symbols are located on the underside of the model object, which faces the camera(s).

Flat marking symbols are advantageously provided on the underside of the model object. The flat marking symbols applied to the underside of the model objects can be letters, numbers and/or abstract symbols, and can appear in color or be reflective so they can be better recognized and distinguished.

The symbols related to the identification of the object can also appear, for example, in the form of a barcode. The necessary marking symbols are simple to produce and apply, and are not apparent to the user, because they are located on the underside of the model object.

Marking symbols in different forms can be applied to the underside of a model, so different objects of virtual reality that are distinguished by the application of different identification symbols can be activated with a single model object.

In an advantageous input device according to the invention, the camera or cameras is or are located beneath an optically transparent plate, above which the operator holds the model object with its underside in the position facing the camera(s). The plate preferably comprises glass or Plexiglas (registered trademark) having one or more of the following properties: transparency or translucence, clearness or matte finish, coloring or absence of color, coating or no coating.

In an input device according to the invention, an electronic camera (e.g., video camera, CCD camera) having an interface that is suitable for electronic image transfer to a digital computer can be provided as a camera.

A personal computer can be used for image evaluation related to the position of the marking symbols, and thus of the model object, and the identification symbols of the model object. It is therefore possible, at low cost, to embody an input device for executing the method of the invention using components available on the mass market.

Particularly in the field of advertising, the method and the input device of the invention can advantageously be implemented to display advertised products in desired positions. An illustrative example cited here is the concept of a "virtual auto dealership." All of the vehicle types offered by a dealer are stored in different embodiments as computer graphics, and can be displayed on a monitor or a projection screen.

The method of the invention advantageously presents anyone, namely salespeople, management or customers, with the opportunity to select and vary the desired view of a selected vehicle type, without necessitating any experience.

In an embodiment of a "virtual auto dealership" possessing the features of the invention, one or more electronic cameras is or are disposed beneath an optically transparent plate. In the use of only one camera, the optical axis is preferably oriented perpendicular to the plate. In the use of at least two cameras, their optical axes can likewise be oriented perpendicular. (This is the classic stereo arrangement with parallel axes.) It is advantageous, however, to use an arrangement in which the optical axis is oriented at a diagonal relative to the optically transparent plate, and two vertical planes are disposed perpendicular to one another. For physical reasons, this arrangement is better suited than the classic stereo arrangement for determining the tilting angle (i.e., the diagonal positions of the object).

An easy-to-handle model object, such as a small model automobile on a 1:25 scale, serves as the hand-held input medium. The underside of the model object, that is, the side facing the camera(s), is provided with one or more flat marking symbols, such as letters, numbers or abstract symbols, for marking and identification purposes.

The camera images of these marking symbols are evaluated by a computer according to image-processing methods. The result of this evaluation is an identification of the model object, as well as its spatial position. In this way, a plurality of objects appearing simultaneously in the camera image(s) can be distinguished, and their individual positions can be indicated.

These results are transmitted to a graphics unit (graphics workstation PC graphics), with the associated objects, e.g., one, two or more vehicles of varying make, being displayed in their positions, as predetermined by the operator, on the display device of the graphics unit. Colored, flat marking symbols are advantageously applied to the underside of the model object. They can be located again (segmented) with simple means. In this case, the lighting must contain all of the color components (for example, visible white light). If the lighting is to remain invisible (for example, in spaces that are darkened for a more brilliant color-graphics display), the use of infrared light and retroreflecting marking symbols is advantageous.

The recognition of the model object and the determination of its position are subsequently effected through the separation of the shape and position parameters from the contour course of the marking symbols. The implementation of the method according to the invention is especially advantageous, because only one flat marking symbol is required for both partial tasks, namely recognition and localization, so the available surface can be well utilized, and little computation is required.

In addition to other alternatives, a barcode, for example, could be used for the recognition process, and a few simple, e.g., round, colored or reflective marks could additionally be used for ascertaining a position with classic methods of photogrammetry.

Figure 2:
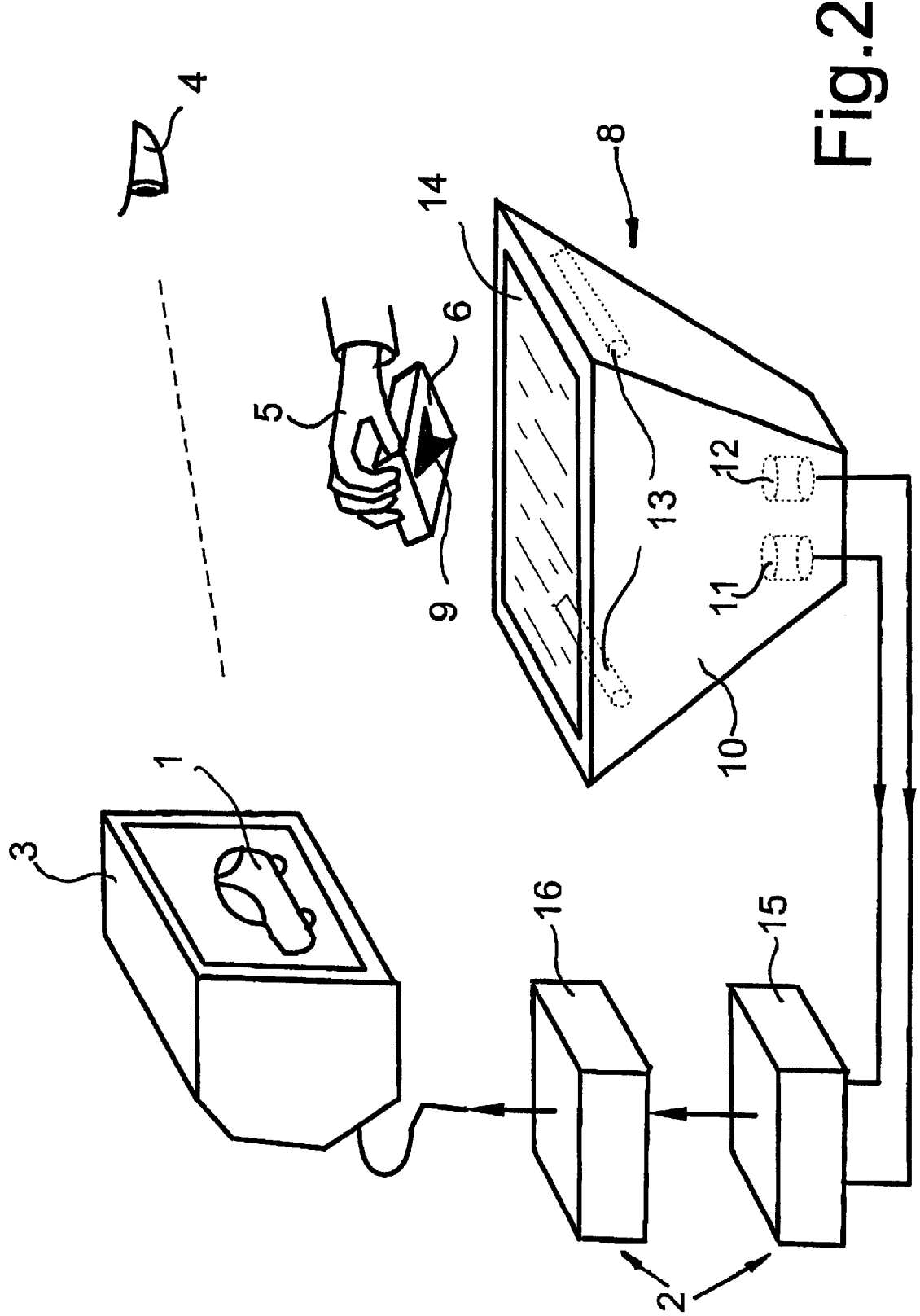
Figure 3:
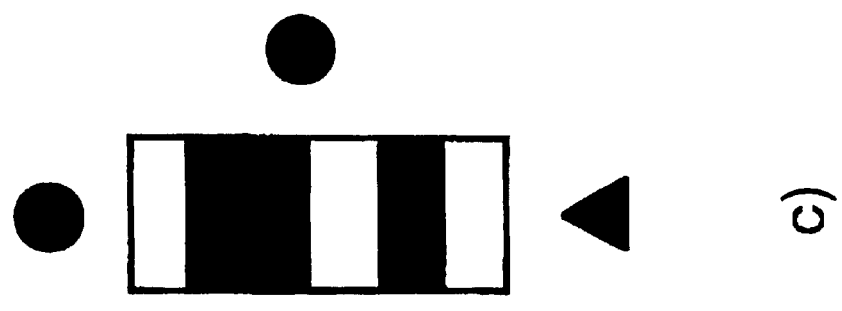
Figure 3:
Figure 3:
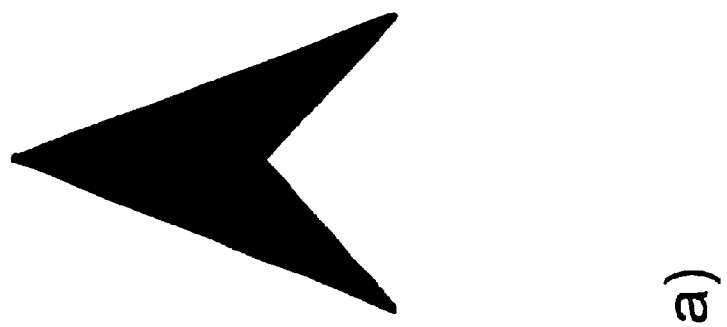

The invention is explained below by way of advantageous embodiments illustrated in the drawing. Shown are in:

FIG. 1 a schematic representation of a first input device for executing the method according to the invention;

FIG. 2 a schematic representation of a second input device for executing the method according to the invention; and FIG. 3 three examples (a), (b) and (c) for marking symbols that can be applied to a model object.

The two devices illustrated in FIGS. 1 and 2 are used for the virtual-reality display of the position of an object 1 on a display device 3 that is actuated by way of a computer 2. The eye 4 of a user observes the virtually-displayed object 1 on the display device 3. In his hand 5, the user holds a physical model object 6 in a desired position and orientation.

The model object 6 is a portable, easy-to-handle item, such as a block, as shown in FIGS. 1 and 2, or a structural model of the virtually-displayed object 1. The model object 6 observed by an electronic camera 7 (FIG. 1), or two electronic cameras 11 and 12 (FIG. 2), of an operating panel 8 that will be described in detail below is provided on its underside with a marking symbol 9, which comprises a material that stands out clearly from the surroundings in the camera image, for example through its color(s) or its reflective behavior. The marking symbol 9 is located in an arrangement that is suited for, on the one hand, ascertaining the spatial object position from the camera image and, on the other hand, for distinguishing between different objects 1 to be displayed, that is, for identification.

The aforementioned operating panel 8 has a housing 10, which, in the case of the embodiment of FIG. 1, supports an electronic camera 7 or, in the case of the embodiment of FIG. 2, two electronic cameras 11 and 12, a lighting device 13 and an optically transparent plate 14 at its top side. The electronic camera 7 or the two electronic cameras 11 and 12 serves or serve in recording images of the marking symbol 9 in monoscopy and stereoscopy. In the case of stereoscopy, with two cameras, the optical axes of the optical cameras can be parallel to one another, as shown in FIG. 2, or, advantageously, inclined toward one another. The lighting device 13 serves in sharpening contrast, thereby employing a multi-spectral (white), infrared or ultraviolet light.

On the optically transparent plate 14, the physical model object 6 can be placed in the detection region of the electronic camera 7 or cameras 11 and 12, so the user can comfortably guide the object on the surface of the plate 14 with his hand 5 in those situations in which only the three degrees of freedom of the movement on the plate 14 are to be controlled—in other words, the displacement on the plate 14 and the rotation about a vertical axis extending perpendicular to the plane of the plate. The plate 14 also serves in sharpening contrast, that is, filtering, with colored lighting. For example, the contrast can be sharpened through a red-transparent plate 14 or a plate 14 embodied as an infrared filter in infrared lighting.

In FIGS. 1 and 2, the computer 2 in the device for displaying an object 1 in a desired position in virtual reality comprises a device 15 for image processing, and a computer-graphics device 16. The device 15 for image processing includes elements for recording images, segmenting elements for separating the image of the marking symbol 9 from all other image parts, elements for object identification through the evaluation of the color, shape or a code, and elements for calculating back to the spatial object position from the camera image (FIG. 1) or the camera images (FIG. 2) of the marking symbols 9. The computer-graphics device 16 includes elements for storing virtual 3-D objects, and elements for calculating the views of objects 1 to be displayed, as a function of the respective observer's position (monoscopic/stereoscopic).

In the display device 3 actuated by way of the computer 2, the virtually-imaged object 1 is displayed (monoscopically/stereoscopically) corresponding to the view that the user has predetermined with the use of the physical model object 6.

FIG. 3 illustrates three examples (a), (b) and (c) for marking symbols that can be applied to the underside of the physical model object 6 (FIGS. 1 and 2); all three of the symbols are well-suited for ascertaining the spatial object position from the camera image and, additionally, for distinguishing among virtually-displayed objects. The two marking symbols (a) and (b) can be distinguished solely based on their contour course, even with a perspective distortion. The corner points can be used as fixed points for ascertaining the position of the physical model object.

The marking symbol (c) represented in FIG. 3, in contrast, has a slightly more complex structure, but has proven very robust. Four marks, which, in the example, are formed by three circular surfaces and one triangular surface, serve as fixed points for ascertaining position. To preclude ambiguities (modulo 180°), different contours, namely circles and a triangle in the illustrated embodiment, are used as marks. The identification is effected by a binary code in a barcode strip. In the illustrated embodiment of the marking symbol (c), the triangle exhibits the highest-value bit of the barcode strip, and the identification has the value of 010110 (binary) equals 22 (decimal).

What is claimed is:

1. An input device using a human-machine interface to control the position of an image representing a vehicle type offered by an auto dealer or another advertised product that is graphically displayed in virtual reality on a display device of a graphics unit, said device comprising:

at least one stationary electronic camera;

an input medium that includes at least one material model object representing the vehicle type or other advertised product to be displayed, said material model object being actively movable in all six degrees of freedom by an operator's hand, thus being easy for the operator's hand to manipulate, and being provided with at least one unique marking symbol on a side that faces said camera, wherein said camera records said marking symbol into the form of camera images; and a computer connected to evaluate the camera images in accordance with image processing methods such that information representing the spatial position of said material model object is transmitted by said computer to the graphics unit, whereby the image of the associated vehicle type or product is correspondingly displayed in a position corresponding to the position of said material model object relative to said camera as virtual reality on said display device of said graphics unit.

2. The input device according to claim 1, wherein said marking symbol provided on said material model object also contains an identification of the respective advertised vehicle type or product to be displayed as virtual reality, said identification likewise being recorded by said camera and evaluated according to image-processing methods, so that material model objects provided with different identifications can be distinguished, and their individual positions can be indicated, and the result of this evaluation is transmitted to the graphics unit where the image of the associated advertised vehicle type or product that has been recognized on the basis of its identification is displayed as virtual reality in the position corresponding to the position of the respective material model object relative to said camera, as predetermined by the operator's hand, on said display device.

3. The input device according to claim 2, wherein said material model object has an underside to which is applied a respective one of a plurality of marking symbols, each with a different orientation, so that a single material model object can be associated with different advertised vehicle types or products in virtual reality corresponding to the identification of the respective advertised vehicle type or product provided on said marking symbols.

4. The input device according to claim 2, wherein said computer is used to perform the camera image evaluation related to the position of said marking symbol and thus of said material model object, as well as of the identification provided on said material model object.

5. The input device according to claim 4, wherein said computer includes a device for image processing and a computer graphics device, said image processing device includes elements for recording images, segmenting elements for separating the image of said marking symbol from all other image parts, elements for object identification through evaluation of a color, shape or code associated with said marking symbol, and elements for calculating back to the spatial material model object position from the camera image or the camera images of said marking symbols, and said computer graphics device includes elements for storing virtual 3-D objects, and elements for calculating the views of advertised vehicle types or products to be displayed as virtual reality, as a function of a respective observer's position.

6. The input device according to claim 1, wherein said material model object has an underside which faces said camera and on which said marking symbol is provided.

7. The input device according to claim 6, wherein said marking symbol provided on the underside of said material model object is flat.

8. The input device according to claim 7, wherein said marking symbol provided on the underside of said material model object is at least one letter, number and/or abstract symbol.

9. The input device according to claim 8, wherein said marking symbol is colored, or is reflective, or is a barcode.

10. The input device according to claim 1, further comprising a plate beneath which said camera is located and above which the operator's hand holds said material model object with an underside of said material model object facing said camera, wherein said plate has one or more of the following properties: transparency or translucence, clearness or matte finish, coloring or absence of color, coating or no coating.

11. The input device according to claim 10, wherein said at least one camera comprises two cameras having respective optical axes that are inclined toward one another, are oriented at a diagonal with respect to said plate, and lie in two vertical planes extending perpendicular to one another.

12. The input device according to claim 10, further comprising a housing of an operating panel in which said electronic camera is disposed, said housing also accommodating a lighting service, and said housing having a top side where said plate is located.

13. The input device according to claim 12, wherein said plate supports said material model object in a detection region of said camera for comfortable guidance of said material model object if only three degrees of freedom of the movement on said plate are to be controlled, which degrees of freedom include translational displacement on said plate and rotation about a vertical axis extending perpendicular to said plate.

14. The input device according to claim 12, wherein said lighting service emits multispectral (white), infrared or ultraviolet light.

15. The input device according to claim 14, wherein said plate is designed for sharpening contrast by filtering with colored lighting.

16. The input device according to claim 15, wherein said plate is red-transparent, or is designed as an infrared filter, and the lighting is infrared lighting.

17. The input device according to claim 1, wherein said computer is used to perform the camera image evaluation related to the position of said marking symbol and thus of said material model object.

18. The input device according to claim 17, wherein said computer includes a device for image processing and a computer graphics device, said image processing device includes elements for recording images, segmenting elements for separating the image of said marking symbol from all other image parts, elements for object identification through evaluation of a color, shape or code associated with said marking symbol, and elements for calculating back to the spatial material model object position from the camera image or the camera images of said marking symbols, and said computer graphics device includes elements for storing virtual 3-D objects, and elements for calculating the views of advertised vehicle types or products to be displayed as virtual reality, as a function of a respective observer's position.

19. The input device according to claim 1, wherein said electronic camera has an interface that is suitable for electronic image transmission to a digital computer.

* * * * *